US011662435B2

(12) United States Patent
Song

(10) Patent No.: US 11,662,435 B2
(45) Date of Patent: May 30, 2023

(54) CHIP SCALE INTEGRATED SCANNING LIDAR SENSOR

(71) Applicant: Liturex (Guangzhou) Co. Ltd, Guangzhou (CN)

(72) Inventor: Yunpeng Song, San Ramon, CA (US)

(73) Assignee: LITUREX (GUANGZHOU) CO. LTD, Guangzhou (CN)

( * ) Notice: Subject to any disclaimer, the term of this patent is extended or adjusted under 35 U.S.C. 154(b) by 753 days.

(21) Appl. No.: 16/723,839

(22) Filed: Dec. 20, 2019

(65) Prior Publication Data

US 2020/0319315 A1 Oct. 8, 2020

Related U.S. Application Data

(63) Continuation-in-part of application No. 16/375,788, filed on Apr. 4, 2019, now Pat. No. 11,573,304.

(51) Int. Cl.
*G01S 7/481* (2006.01)
*G01S 7/4863* (2020.01)

(52) U.S. Cl.
CPC .......... *G01S 7/4817* (2013.01); *G01S 7/4813* (2013.01); *G01S 7/4818* (2013.01); *G01S 7/4863* (2013.01)

(58) Field of Classification Search
CPC .... G01S 7/4817; G01S 7/4863; G01S 7/4813; G01S 7/4818; G01S 7/4816; G01S 17/42; G01S 7/481; H01L 25/167
USPC ....................................................... 356/5.01
See application file for complete search history.

(56) References Cited

U.S. PATENT DOCUMENTS 9,310,471 B2 4/2016 Sayyah et al.

OTHER PUBLICATIONS

Je-Hyung Kim et al., "Hybrid Integration of Solid-State Quantum Emitters on a Silicon Photonic Chip", NANO Letters, vol. 17, 2017, pp. 7394-7400.
Graham D. Marshall et al., "Laser written waveguide photonic quantum circuits", Optics Express, vol. 17, No. 15, Jul. 20, 2009, pp. 12546-12554.
X. Gu et al., Miniature Nonmechanical Beam Deflector Based on Bragg Reflector Waveguide With a Number of Resolution Points Larger Than 1000, IEEE Photonics Journal, vol. 4, No. 5, Oct. 2012, pp. 1712-1719.
Yun Wang et al., "Vertical-Cavity Surface-Emitting Laser Flip-Chip Bonding to Silicon Photonics Chip", 2015 IEEE Optical Interconnects Conference (OI), Apr. 20-22, 2015, 2 pp total.
Steven Slivken et al., "Monolithic beam steering in a mid-infrared, surface-emitting, photonic integrated circuit", www.nature.com/scientificreports. Aug. 16, 2017, pp. 1-7.

*Primary Examiner* — Daniel L Murphy
(74) *Attorney, Agent, or Firm* — Womble Bond Dickinson (US) LLP

(57) ABSTRACT

In one embodiment, a chip-scale LiDAR device can include a chip with three layers. The first layer includes a number of micromechanical system (MEMS) mirrors. The second layer includes a laser source; a beam splitter connected to the laser source; a number of waveguides, each connected to the beam splitter; and a number of beam deflectors, each beam deflector coupled with one of the number of waveguides. The third layer includes a receiving unit for receiving and processing reflected laser signals of one or more laser beams from the laser source. The first layer, the second layer, and the third layer are vertically attached to each other using either wafer bonding and/or solder bonding.

20 Claims, 11 Drawing Sheets

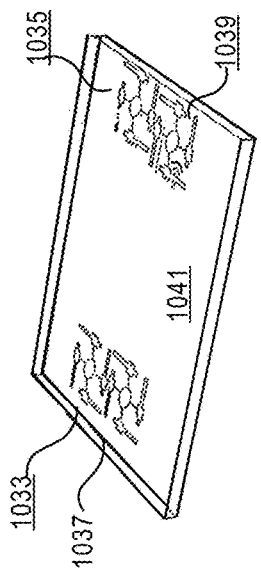
FIG. 10C
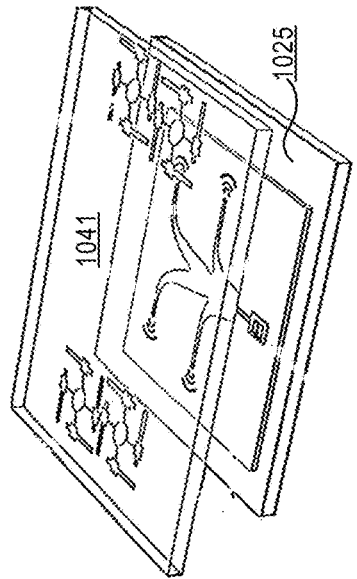
FIG. 10D
FIG. 10E
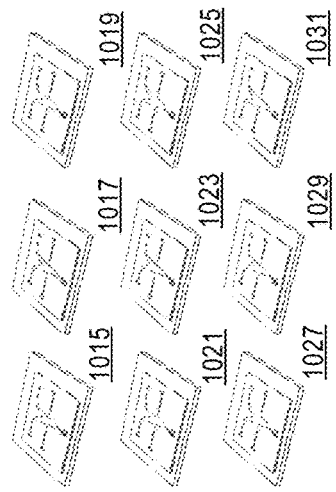
FIG. 10A
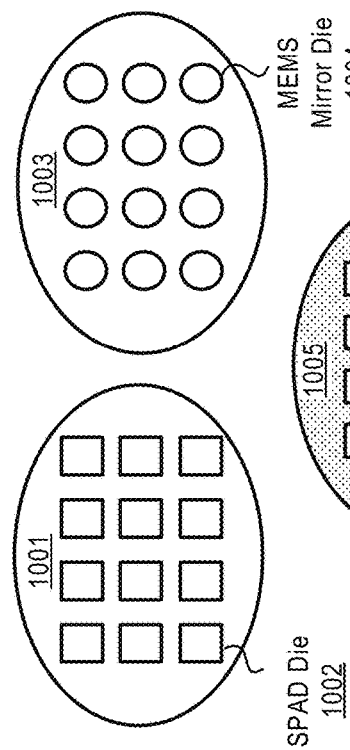
FIG. 10B

CHIP SCALE INTEGRATED SCANNING LIDAR SENSOR

CLAIM OF PRIORITY

This patent application is a continuation-in-part of U.S. patent application Ser. No. 16/375,788, titled "A LiDAR DEVICE WITH A DYNAMIC SPATIAL FILTER", filed Apr. 4, 2019 (Inventor: Yunpeng Song). The U.S. patent application Ser. No. 16/375,788 claims the benefit of priority to U.S. Provisional Application No. 62/663,929, titled "METHOD FOR EXTENDING RANGE AND SENSITIVITY OF SOLID STATE LIDAR SYSTEM AND APPARATUS THEREFOR", filed Apr. 27, 2018. The disclosures of the aforementioned applications are herein incorporated by reference in their entireties.

TECHNICAL FIELD

Embodiments of the present invention relate generally to remote sensing, and more particularly relate to chip-scale LiDAR sensor devices and a method of making such sensor devices.

BACKGROUND

A LiDAR device can measure distances to objects in an environment by illuminating the objects with laser pulses and measuring reflected pulses from the objects. LiDAR devices typically utilize high-grade optics and a rotating assembly to create a wide field of view, but such implementation tends to be bulky and costly. Solid-state LiDAR sensors tend to be less costly but still may have large dimensions.

In many systems, such as advanced driver assist systems (ADAS), small-dimension solid state LiDAR sensors would be preferred, since such LiDAR sensors can provide a number of desired advantages, including higher sensor reliability, longer lifetime, smaller dimension, lower weight, and lower cost.

SUMMARY

In one embodiment, a chip-scale LiDAR device can include a chip with three layers. The first layer includes a number of micromechanical system (MEMS) mirrors. The second layer includes a laser source, a beam splitter connected to the laser source, a number of waveguides, each connected to the beam splitter, and a number of beam deflectors, each beam deflector coupled with one of the number of waveguides. The third layer includes a receiving unit for receiving and processing reflected laser signals of one or more laser beams from the laser source. The first layer, the second layer, and the third layer are vertically attached to each other using either wafer bonding and/or solder bonding.

The other functions and advantages of various embodiment of the invention will be apparent from the accompanying drawings and from the detailed description that follows.

BRIEF DESCRIPTION OF THE DRAWINGS

Embodiments of the disclosure are illustrated by way of example and not limitation in the figures of the accompanying drawings, in which like references indicate similar elements.

FIGS. 10A-10E illustrate a process of making a chip-scale LiDAR device in accordance with an embodiment.

DETAILED DESCRIPTION

Figure 1:
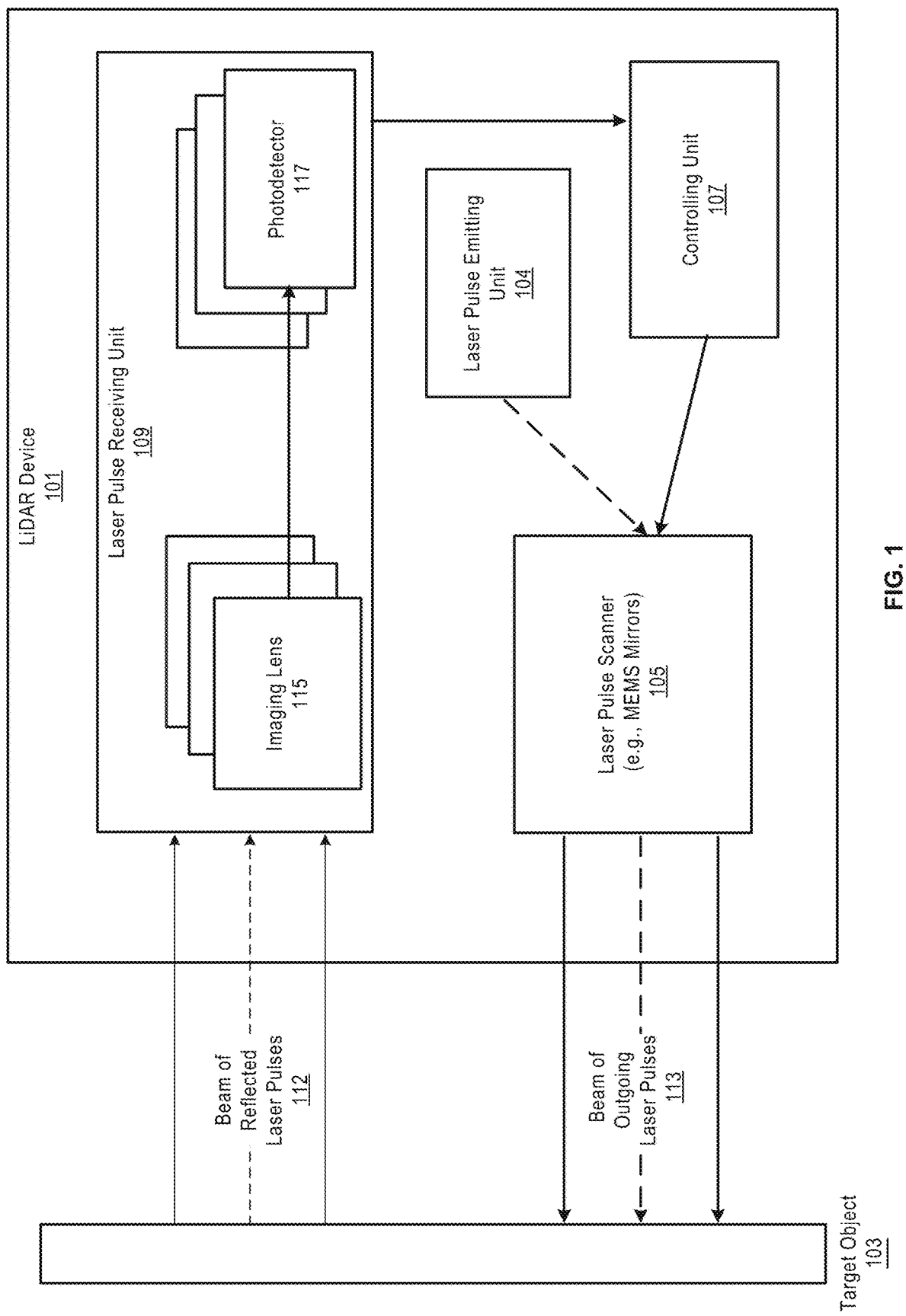
FIG. 1 illustrates an example LiDAR device in which embodiments of the invention can be implemented in accordance with an embodiment.

The following description and drawings are illustrative and are not to be construed as limiting. Numerous specific details are described to provide a thorough understanding of various embodiments. However, in certain instances, well-known or conventional details are not described in order to provide a concise discussion of the embodiments.

Described herein are various embodiments of a chip-scale LiDAR device and a method of making such a LiDAR device. The various embodiments enable high-volume manufacturing of such LiDAR devices for applications where cost, weight, power and form factor are constrained.

According to one aspect of the invention, a chip-scale LiDAR device can include a chip with three layers. The first layer includes a number of micromechanical system (MEMS) mirrors. The second layer includes a laser source, a beam splitter connected to the laser source, a number of waveguides, each connected to the beam splitter, and a number of beam deflectors, each beam deflector coupled with one of the number of waveguides. The third layer includes a receiving unit for receiving and processing reflected laser signals of one or more laser beams from the laser source. The first layer, the second layer, and the third layer are vertically attached to each other using either wafer bonding and/or solder bonding.

In one embodiment, the second layer and the third layer are attached to each other using wafer bonding, and the first layer and the third layers are attached to each other using solder bonding. One or more spacers are used between the first layer and the third layer to create spacing between the first layer and the second layer, such that the laser beams from the laser source in the second layer can be directed to their respective MEMS mirrors on the first layer.

In an alternative embodiment, the first layer and the second layer are directly attached to each other without using any spacers between the first layer and the third layer. In this embodiment, the first layer can be a glass panel with a predetermined thickness; the thickness of the glass panel enables the laser beams from the laser source in the second layer to be directed to their respective MEMS mirrors on the first layer.

In one embodiment, there can be an equal number of MEMS mirrors, waveguides, and beam deflectors. Each waveguide can correspond to a different one of the number of beam deflectors, and each beam deflector can correspond to a different one of the number of MEMS mirrors. Each of the number of beam deflectors is to deflect one or more laser beams from the laser source out of plane from the second layer to a corresponding MEMS mirror on the first layer. The one or more laser beams are guided from the laser source to the beam deflector through a corresponding waveguide. Each of the number of MEMS mirrors is coupled to one or more actuators, which are configured to scan the MEMS mirror in a zigzag or spiral pattern to steer laser beams from the laser source to one or more different directions.

In one embodiment, the receiving unit in the third layer includes a spatial filter, on which an aperture is dynamically created based on one or more directions that each of the MEMS mirrors on the first layer is scanning, the aperture enabling photons reflected from the one or more directions to pass through the spatial filter.

According to another aspect of the invention, a method of making a chip-scale light detection and ranging (LiDAR) device includes fabricating a first wafer with a number of dies, each die with a photonic integrated circuit (PIC) formed thereon. Each PIC includes a laser source, a beam splitter connected to the laser source, and a number of waveguides, each waveguide being connected to the beam splitter. Each PIC also includes a number of beam deflectors, each beam deflector coupled with one of the number of waveguides. The method further includes fabricating a second wafer with the number of dies, each die including a number of single-photon avalanche diodes (SPADs) formed thereon, and each die configured to receive and process reflected laser signals of one or more laser beams from the laser source; attaching the first wafer and the second wafer back to back to create an integrated wafer; and dividing the integrated wafer into a number of integrated dies.

In one embodiment, the method further includes fabricating a third wafer with multiple dies, each die with a micromechanical system (MEMS) mirror formed thereon; and dividing the third wafer into different dies. The method further includes attaching one or more of the multiple dies to a glass panel; and attaching the glass panel to one of the number of integrated dies. In one embodiment, the glass panel and the integrated die are attached to each other using solder bonding.

The above summary does not include an exhaustive list of all aspects of the present invention. It is contemplated that the invention includes all systems and methods that can be practiced from all suitable combinations of the various aspects summarized above, and also those disclosed in the Detailed Description of the disclosure.

Solid State LiDAR Device

FIG. 1 illustrates an example LiDAR device in which embodiments of the invention can be implemented in accordance with an embodiment.

The example LiDAR device can be a solid state LiDAR device 101, which can measure distances to objects in an environment by illuminating the objects with laser pulses. Differences in return times of the reflected laser pulses and wavelengths can be used to create a point cloud of the environment. The point cloud can provide spatial location and depth information, for use in identifying and tracking the objects.

As shown in FIG. 1, the LiDAR device 101 can include a laser pulse emitting unit 104, a laser pulse scanner 105, a laser pulse receiving unit 109, and a controlling unit 107. The laser pulse emitting unit 104 can include one or more laser emitters that emit beams of short pulses of laser light including photons of various frequencies.

For example, in FIG. 1, the laser pulse emitting unit 104 emits a beam of outgoing laser pulses 113. The beam of outgoing laser pulses 113 can be steered or scanned by the laser pulse scanner 105 in one or more directions using a variety of mechanisms, including microelectromechanical system (MEMS) mirrors, and one or more optical phased arrays (OPA). Each of the one or more directions can be referred to as a steering direction or a scanning direction. A vertical angle and a horizontal angle associated with each steering direction can be referred to as a steering angle or a scanning angle respectively. The laser pulse scanner 105 can steer one or more beams of laser pulses in a steering direction. Each beam of laser pulses can have a fixed number of pulses.

The controlling unit 107 can include control logic implemented in hardware, software, firmware, or a combination thereof. The controlling logic 107 can drive the other units or subsystems 104, 105 and 109 of the LiDAR device 101 in a coordinated manner, and can execute one or more data processing algorithms to perform one or more operations for signal filtering and object detection. For example, the controlling unit 107 can synchronize the laser pulse emitting unit 104 and the laser pulse scanner 105 so that the laser pulse scanner 105 can scan a horizontal field of view in multiple lines.

The laser light receiving unit 109 can collect one or more beams of laser pulses (e.g., beam of laser pulses 112) reflected from a target object 103 using one or more imaging lens (e.g., imaging lens 115), and focus the beams of laser pulses on one or more photodetectors (e.g., photodetector 117). Each photodetector can be a high-sensitivity photodiode, for example, a linear mode avalanche-photodiode (APD) or a single-photon avalanche diode (SPAD). The one or more photodetectors can convert photons in the reflected beam of laser pulses into electricity. The laser pulse receiving unit 109 can send returned signals incident on each photodetector to the controlling unit 107 for processing.

In one embodiment, laser diodes in the laser pulse emitting unit 104 can operate in a pulsed mode with a pulse repeating at a fixed interval (e.g., every few micro-seconds). The laser diodes and laser drive circuits for providing appropriate bias and modulation currents for the laser diodes can be chosen according to predetermined performance parameters of the LiDAR device 101. Examples of the performance parameters can include a required maximum range of scanned space and resolution.

Dynamic Spatial Filter

In the example LiDAR device illustrated in FIG. 1, various types of noises (e.g., ambient light and electronic noises) can negatively impact the SNR of the LiDAR device 101. When the laser pulse receiving unit 109 receives scattered ambient light, the photodetectors (e.g., photodetector 117) can be saturated, particularly when the ambient light is sunlight, which tends to have an enormous power on a broad range of wavelengths. The sunlight-induced noises can be orders of magnitude higher than weak LiDAR signals, for example, laser pulses reflected from bright surfaces such as landmass, snow and thick clouds.

To increase the detection range of a LiDAR device, techniques for robust rejection of ambient light and high-speed acquisition of returned signals can be used. However, due to the lack of a mechanical rotating scanner and a mechanical detector scanner in a solid state LiDAR device, some ambient light filtering techniques that are effective in an electromechanical LiDAR device may not be feasible in a solid state LiDAR device.

For example, in an electromechanical LiDAR device, one ambient light filtering technique is to use a single avalanche photodiode (APD) or a small number of APDs as a photodetector, which can effectively function as a natural spatial filter due to its small dimensions because any photons not incident on the photodetector are automatically filtered out. The natural spatial filter would work in an electromechanical LiDAR device due to the presence of a mechanical rotating scanner and a mechanical detector scanner in the electromechanical LiDAR device. The mechanical rotating scanner and a mechanical detector scanner would accurately direct desired signals reflected from a large reflection surface to the photodetector, whose photon multiplication gain can further improve signal-noise ratios (SNR) of the electromechanical LiDAR device, thereby increasing its detection ranges.

In a solid state LiDAR device such as the LiDAR device 101, however, it would be difficult to use a single APD or a small number of APDs as a natural spatial filter because a solid state LiDAR device does not have a mechanical rotating scanner or a mechanical detector scanner. Such a solid state LiDAR device therefore would miss signals reflected from a target object with a large reflection surface. Although an APD pixel array (e.g., a 2-D focal plane array) could be used to compensate for the lack of a mechanical laser scanner and a mechanical detector scanner to enable a solid state LiDAR device to receive more reflected signals from a large reflection surface, such a pixel array would lose its natural spatial filtering capability due to its large size. Further, some APD pixel arrays (e.g., a linear mode APD pixel array) would be technically difficult and prohibitively expensive to make.

Therefore, to increase the detection ranges of a solid state LiDAR device such as the LiDAR device 101, a 2-D pixel array of Geiger-mode single-photon avalanche diodes (SPADs) would be used as photodetectors, coupled with a separate dynamic spatial filter positioned before the 2-D pixel array. The 2-D pixel array of SPADs can include multiple columns of SPADs, with each column of SPADs connected in parallel in the vertical direction. A simple 2-D SPAD array with a single column of SPAD would be undesirable, because a solid state LiDAR device with such a simple SPAD array as photodetectors would require each vertical steering angle of the laser pulse scanner to correspond to a single SPAD on the simple SPAD array. Such a configuration therefore would have a number of drawbacks. For example, in such a configuration, each SPAD as a photodetector would need a time-to-digital converter (TDC), which reduces the fill factor of the active area on the photodetectors. Further, in such a configuration, each SPAD photodetector, which has a non-negligible dead time, may miss reflected photons due to dark events and/or ambient light.

In a 2-D pixel array as disclosed herein, however, one TDC can be used for a column of SPADs, thereby increasing the fill factor of the active area. Further, using a column of SPADs instead of one SPAD as a photodetector for a vertical steering angle can avoid missing reflected photons due to the dead time associated with each SPAD photodetector.

In one embodiment, the spatial filter can be dynamically turned on and turned off based on the current steering directions or steering angles of the LiDAR device, and therefore can effectively block ambient light and other noises from directions other than the current steering directions. Signals that do pass through the spatial filter are directed to one or more columns of the 2-D pixel array. The combination of the large-dimension 2-D pixel array and the dynamically configured spatial filter can compensate for the lack of mechanical laser scanners and mechanical detector scanners in a solid state LiDAR device. Such a combination can increase the device's SNR without requiring a substantial increase in manufacturing cost.

As used herein, a steering direction refers to a combination of a vertical steering angle and a horizontal steering angle from which reflected pulses are entering the laser receiving unit of a LiDAR system, or in which emitted laser pulses are steered. For example, the combination of a vertical angle of 5 degrees and a horizontal angle of 0 degree is considered as one direction, while the combination of the vertical angle of 5 degrees and a horizontal angle of 5 degrees is considered as another direction. In this disclosure, a scanning angle and a steering angle are used interchangeably, and scanning laser pulses and steering laser pulses are also used interchangeably.

The various aspects, implementations, and embodiments described in this disclosure can also overcome the dead time issue associated with SPADs. By directing beams of incoming laser pulses from different directions to different columns of the 2-D pixel array, a column of SPADs in the pixel array can have sufficient time to recover to its original state after registering a photon, and to become ready to register another photon from a different direction.

Figure 2:
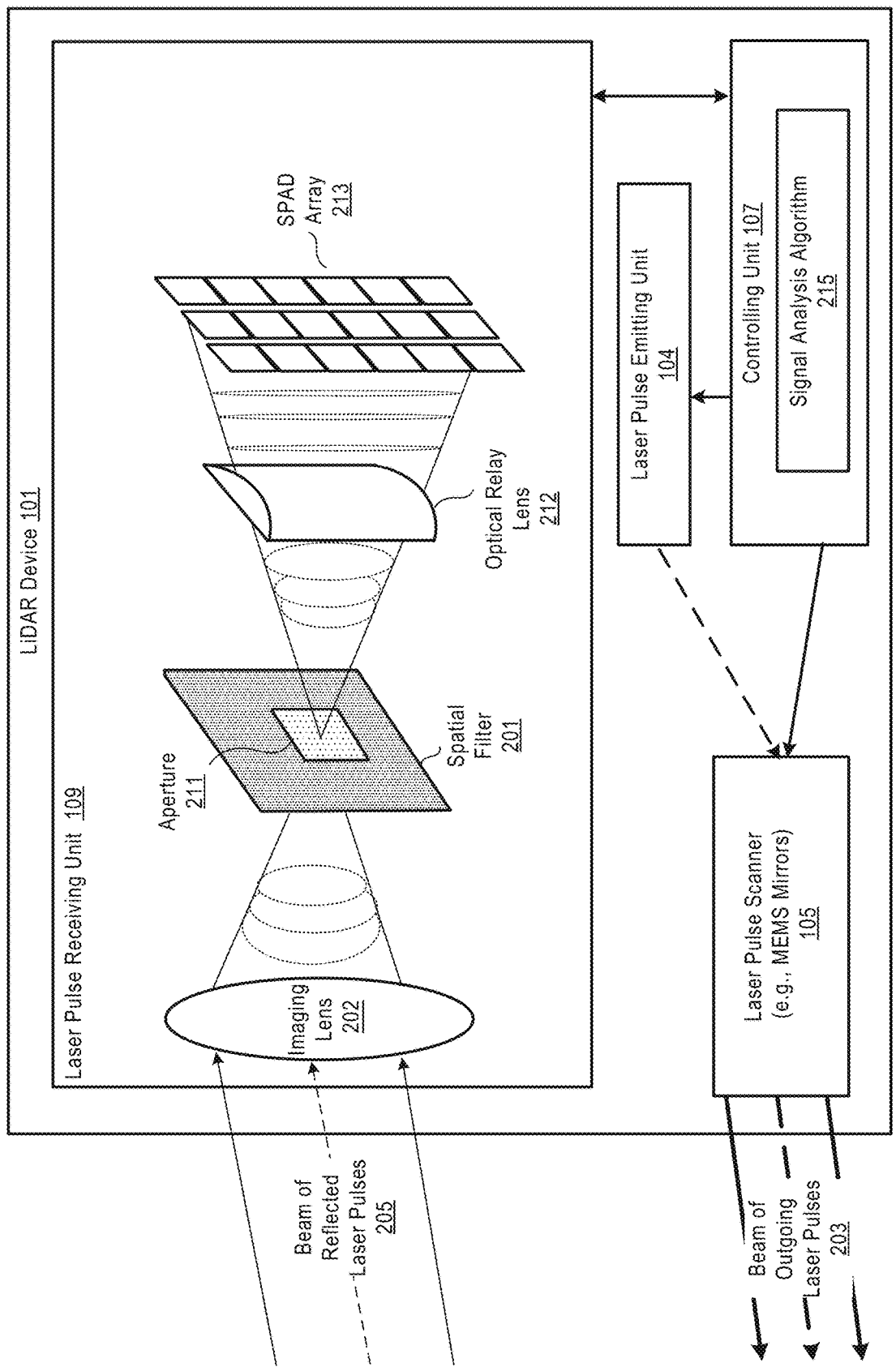
FIG. 2 illustrates an example LiDAR device with a dynamical spatial filter in accordance with an embodiment.

FIG. 2 illustrates an example LiDAR device with a dynamical spatial filter in accordance with an embodiment.

As shown in FIG. 2, the laser pulse receiving unit 109 can include one or more imaging lens (e.g., imaging lens 202), a spatial filter 201, an optical relay lens (e.g., a cylindrical lens) 212, and a 2-D SPAD array 213. The spatial filter 201 can be placed at the image plane of the imaging lens 202, and can be implemented using an electrochromic display, an array of micromechanical mirrors, a liquid crystal display (LCD) in combination with a polarizer, and an electrowetting display. The spatial filter 201 can include an array of segmented areas, with each segmented area representing an optical transmission area capable of being turned on and turned off.

In one embodiment, when the spatial filter is implemented using a LCD, turning a segmented area on would change the segmented area from a low optical transmission area to a high optical transmission area. Conversely, turning-off a segmented area would change the segmented area from a high optical transmission area to a low optical transmission area. A high optical transmission area would allow signals and noises from one or more known directions to pass through the spatial filter 201, whereas a low optical transmission area would substantially block signals and noises reaching the area.

In one embodiment, the spatial filter 201 can be configured to block only signals and noises with certain wavelengths (e.g., wavelengths in a predetermine range) at a low optical transmission area, or allow signals and noises with certain wavelengths to pass through a high optical transmission area.

Each segmented area can correspond to a particular direction from which signals and noises enter the laser pulse receiving unit 109, and can correspond to a pixel of an image to be formed from a target object. Alternatively, multiple segmented areas can correspond to a pixel of the image.

One or more segment areas on the spatial filter 201 can be dynamically turned on to create an aperture based on the manner the laser pulse scanner 105 is steering laser pulses.

For example, when the laser pulse scanner 105 steers laser pulses both horizontally and vertically, a single segmented area can be turned on in response to the laser pulse scanner 105 steering a beam of outgoing laser pulses in a direction corresponding to the single segmented area. When a beam of outgoing laser pulses (e.g., the beam of outgoing laser pulses 203) is steered in a direction of vertical N degrees and horizontal M degrees, a corresponding beam of reflected laser pulses (e.g., the beam of reflected laser pulses 205) can enter the laser pulse receiving unit 109 from that direction. The controlling unit 107 can operate to turn on a corresponding segmented area on the spatial filter 201 so that that segmented area would function as an aperture 211. The controlling unit 107 can coordinate the position of the aperture 211 and the steering directions of the laser pulse scanner 105 so that the imaging lens 202 can focus the beam of reflected laser pulses 205 to the aperture 211. After passing through the aperture 211, the beam of reflected laser pulses 205 can be projected by the optical relay lens 212 as a laser stripe onto a column of the 2-D SPAD array 213. The column of the 2-D SPAD array 213 can be preconfigured to receive reflected signals from a particular horizontal angle. Noises such as ambient light from all other directions other than the direction corresponding to the aperture would be blocked.

As another example, when the laser pulse scanner 105 steers beams of laser pulses vertically only, multiple segmented areas can be turned on as a single unit to constitute the aperture 211. As such, the aperture 211 would correspond to a vertical angle (e.g., vertical N degrees). The number of segmented areas to be turned on as the aperture 211 can be determined based on a predetermined resolution of the LiDAR device. The more segmented areas to be turned on for each vertical steering angle, the higher the resolution of the LiDAR device. Each of the number of turned-on segmented areas further corresponds to a horizontal angle (e.g., horizontal M degrees) at that vertical angle.

In this example, the beam of outgoing laser pulses 203 represents all the outgoing laser pulses emitted at that vertical steering angle. In one implementation, the outgoing laser beam 203 can be expanded horizontally by a diffractive optical element (e.g., a diffractive diffuser) or a cylindrical lens. Accordingly, the beam of reflected laser pulses 205 reflected from the horizontally expanded laser beam 203 can represent all reflected laser pulses from that vertical steering angle. A portion of the reflected laser pulses 205 can pass through one of the turned-on segmented areas in the aperture 211. The portion of the beam of reflected laser pulses 205 corresponds to a horizontal steering angle at the vertical steering angle, and can be projected as a laser stripe on a column in the 2-D SPAD array 213, as configured or programmed by the controlling unit 107. Therefore, the beam of reflected laser pulses 205 at that vertical angle would be projected by the optical relay lens 212 as multiple laser stripes on multiple columns in the 2-D SPAD array 213.

The spatial filter 201 can dynamically change the location of the aperture 211 based on the vertical steering angle of an outgoing laser beam or based on a combination of the vertical steering angle and a horizontal steering angle of the laser beam. The capability of the spatial filter 201 in rejecting noises can be determined by an extinction ratio, defined as a ratio between a number of segmented areas in the aperture 211 and a total number of segmented areas in the whole spatial filter 201.

In one embodiment, the time it takes for a segmented area to be turned on or turned off or vice versa can determine the refresh rate of the LiDAR device 101. For example, the LiDAR device 101 can turn on or turn off a segmented area with a time period ranging from sub-milliseconds to a few milliseconds.

In one embodiment, the 2-D SPAD array 213 can include SPADs that are connected in parallel in the vertical direction but individually addressable in the horizontal direction. The 2-D SPAD array 213 can provide a column of SPADs operating in the Geiger mode for each horizontal steering angle at a given vertical steering angle, to reduce detection dead time.

In one embodiment, the controlling unit 107 can be programmed to schedule vertical scans in such a manner that laser pulse scanner 105 does not scan laser pulses in a next vertical steering angle before the controlling unit 107 completes reading out output signals from a current vertical scan and before a predetermined number of SPADS (e.g., all SPADs) in the 2-D SPAD array 213 passes their dead time.

In one embodiment, the controlling unit 107 can perform one or more data processing algorithms to process data output from the 2-D SPAD array 213. The output intensity of the 2-D SPAD array 213 is proportional to the number of photons returned to the imaging lens 202. The controlling unit 107 can show multiple photons returned within a particular time frame (e.g., 2-4 ns) as a higher amplitude electrical pulse for an analog detection system, or as a higher count in a system with an integrated time-to-digital converter (TDC), thereby distinguishing one or more events from detector noise of the 2-D SPAD array 213 and from ambient light, since the detector noise and the ambient light tend to be relatively uniform in terms of the number of photons within a certain frame.

The dynamic spatial filter 201 described above can work in conjunction with the controlling unit 107 and one or more other subsystems in the LiDAR device 101 to reduce noises reaching the photodetectors by rejecting noises from directions other than the one or more directions corresponding to the aperture 211 in the spatial filter 201. Since ambient light and shot noise are positively related, reducing ambient light can also reduce shot noise. The reduction of noises coupled with the relatively unchanged reflected laser signals would increase the SNR of the LiDAR device 101.

To further increase the SNR of the LIDAR device 101, the controlling unit 107 can be programmed to reject noises that the spatial filter 201 is not able to block. Such noises can include ambient light and any other types of noises passing through the aperture 211; and residue ambient light reaching the 2-D SPAD array 213 through the turned-off segmented areas of the spatial filter 201, as a turned-off segmented area may not block 100% of lights of all wavelengths.

In one embodiment, the controlling unit 107 can perform a signal analysis on the output data from the 2-D SPAD array 213 using a predetermined signal analysis algorithm 215. The signal analysis algorithm 215 can detect a fixed temporal pattern of laser pulses for each range of detection, and use the fixed temporal pattern to identify reflected laser pulse signals from the data output of the 2-D SPAD array 213.

As an illustrative example, the laser pulse emitting unit 104 emits a fixed number of laser pulses for each detection range; and for the given laser pulse emitting unit 104, temporal intervals between the laser pulses in a laser beam tend to be relatively fixed. These temporal intervals can form a temporal pattern that does not change from one range detection to another. The controlling unit 107 can use the temporal pattern to identify reflected laser pulse signals. Photons that do not match the temporal pattern are more likely to be noises and can be discarded.

Figure 3A:
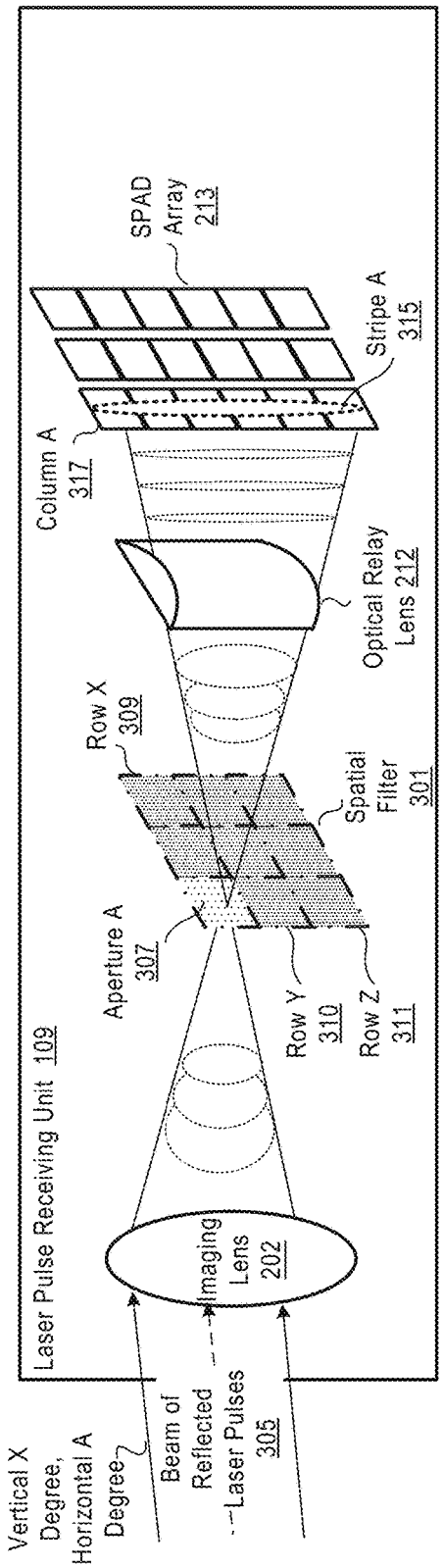
FIGS. 3A and 3B illustrate an example embodiment of the LiDAR device as shown in FIG. 2.
Figure 3B:
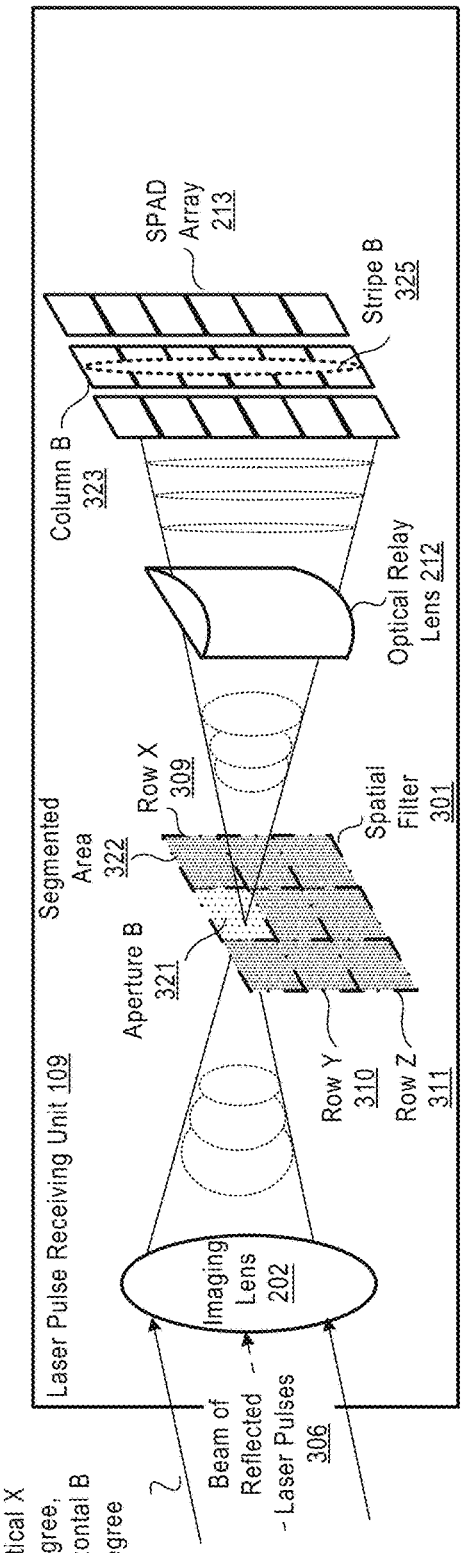

FIGS. 3A and 3B illustrate an example embodiment of the LiDAR device 101 as shown in FIG. 2.

As shown in FIGS. 3A and 3B, the laser pulse scanner 105 of the LiDAR device 101 as shown in FIG. 2 is steering laser pulses both vertically and horizontally. Accordingly, a single segmented area in row X 309 on a spatial filter 301 is turned on to operate as aperture A 307 in response to the laser pulse scanner 105 steering outgoing laser pulses in the direction of a vertical angle of X degrees and a horizontal angle of A degrees. The aperture A 307 would allow a beam of reflected pulses 305 from the direction to pass through the spatial filter 301, as shown in FIG. 3A.

In FIG. 3B, the laser pulse scanner 105 steers laser pulses at a different horizontal angle (e.g., horizontal angle of B degrees) for the vertical angle of X degrees. In response, a different segmented area is turned on to operate as aperture B 321 to allow a beam of reflected pulses 306 from the direction of the vertical angle of X degrees and the horizontal angle of B degrees to pass through the spatial filter 301. While the laser pulse scanner 105 is scanning at this particular direction, the aperture A 307 corresponding to the previous scan direction can be turned off. Therefore, in this particular embodiment, only one segmented area in the spatial filter 301 can be in an ON state to function as the aperture at any particular time.

Similarly, a segmented area 322 immediately next to aperture B 321 can be turned on to operate as the next aperture to allow reflected laser pulses from a next steering direction to pass through the spatial filter 301. The above process can be repeated until the laser pulse scanner 105 completes scanning at the vertical angle of X degrees. The number of segmented areas in each row of the spatial filter 301 can be determined based on a predetermined resolution of an image of a target object. Each segmented area can correspond to one pixel in the image of the target object.

Reflected laser pulses passing through each aperture can be projected by the optical relay lens 212 on different columns 317 and 323 as different laser stripes 315 and 325 on the 2-D SPAD array 213.

The controlling unit 107 can be programmed to read out data from a column on the 2-D SPAD array 213 corresponding to a previous steering direction as soon as the laser pulse scanner 105 starts to scan laser pulses in a next steering direction. Alternatively, the controlling unit 107 can be programmed to read out data from the whole 2-D SPAD array 213 after the laser pulse scanner 105 has completed steering laser pulses at the vertical angle X.

The laser pulse scanner 105 can scan laser pulses at different vertical angles corresponding to row Y 310 and row Z 311 in the same manner that the laser pulse scanner 105 has scanned laser pulses at the vertical angle X.

The controlling unit 107 can be programmed to synchronize the position of each aperture on the spatial filter 301 with each scan direction, and project laser pulses passing through each aperture as different laser stripes on different columns on the 2-D SPAD array 213.

Figure 4:
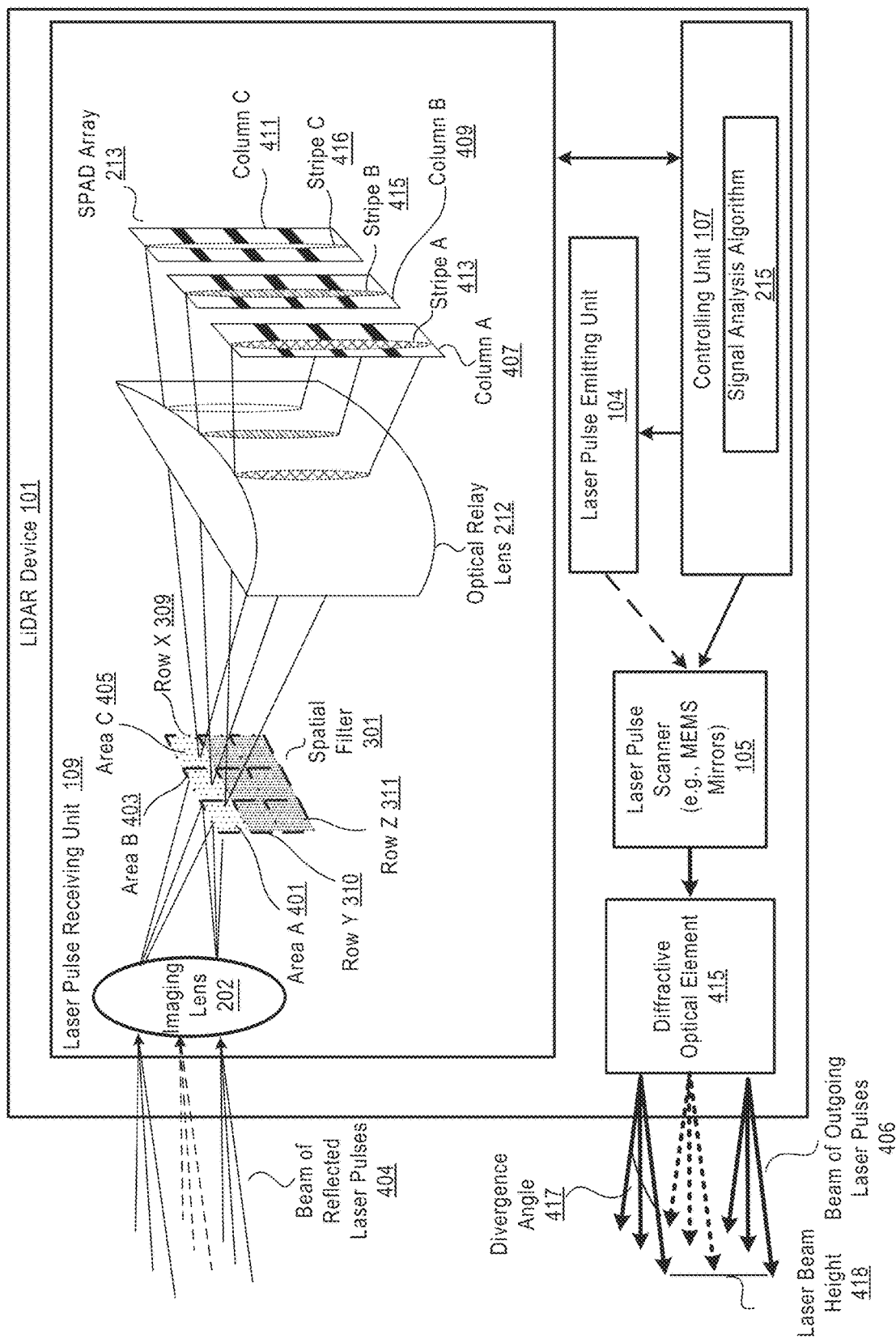
FIG. 4 illustrates another example embodiment of the LiDAR device shown in FIG. 2.

FIG. 4 illustrates another example embodiment of the LiDAR device 101 shown in FIG. 2.

As shown in FIG. 4, outgoing beams of laser pulses are steered vertically only, with each outgoing beam of laser pulses (e.g., outgoing laser beam 406 with a beam height 418) at a particular vertical steering angle (e.g., vertical angle X) being horizontally expanded in an angular manner by a diffractive optical element or a cylindrical lens. A divergence angle 417 of the horizontally expanded laser beam can be determined by a predetermined field of view (FOV) and a predetermined detection range.

For each vertical steering angle, a row of segmented areas (e.g., row X 309) on the spatial filter 301 can be turned on to operate as an aperture for that vertical steering angle. A beam of reflected laser pulses 404 reaching the spatial filter 301 from that vertical steering angle can pass through each of the segmented areas 401, 403 and 405 in the row. The optical relay lens (e.g., a cylindrical lens) 212 can project the laser pulses that have passed through the spatial filter 301 onto different columns 407, 409 and 411 of the 2-D SPAD array 213 as different laser stripes 413, 415, and 416. A complete 3D point cloud of a target object can be produced with a single scan along a vertical axis in the LiDAR device 101.

In one embodiment, a segmented area on the spatial filter 301 can correspond to a pixel of a LiDAR image of a target object and to a steering direction. The LiDAR device 101 can steer laser pulses in a range of steering directions (horizontal angles at a particular vertical angle) in parallel, thus increasing the system's data throughput and reducing the refresh rate of the LiDAR device. In comparison, the LiDAR device described in FIGS. 3A-3B could be limited by the speed of the laser pulse scanner, and/or the speed at which segmented areas on the spatial filter can be turned on and turned off. The LiDAR device in FIGS. 3A-3B also may have a higher refresh rate.

In one embodiment, the LiDAR device 101 can have a bi-axial LiDAR configuration, and can have the laser pulse scanner 105 and a detection system placed in a same orientation as the beam expansion direction to reduce blind spots.

Figure 5:
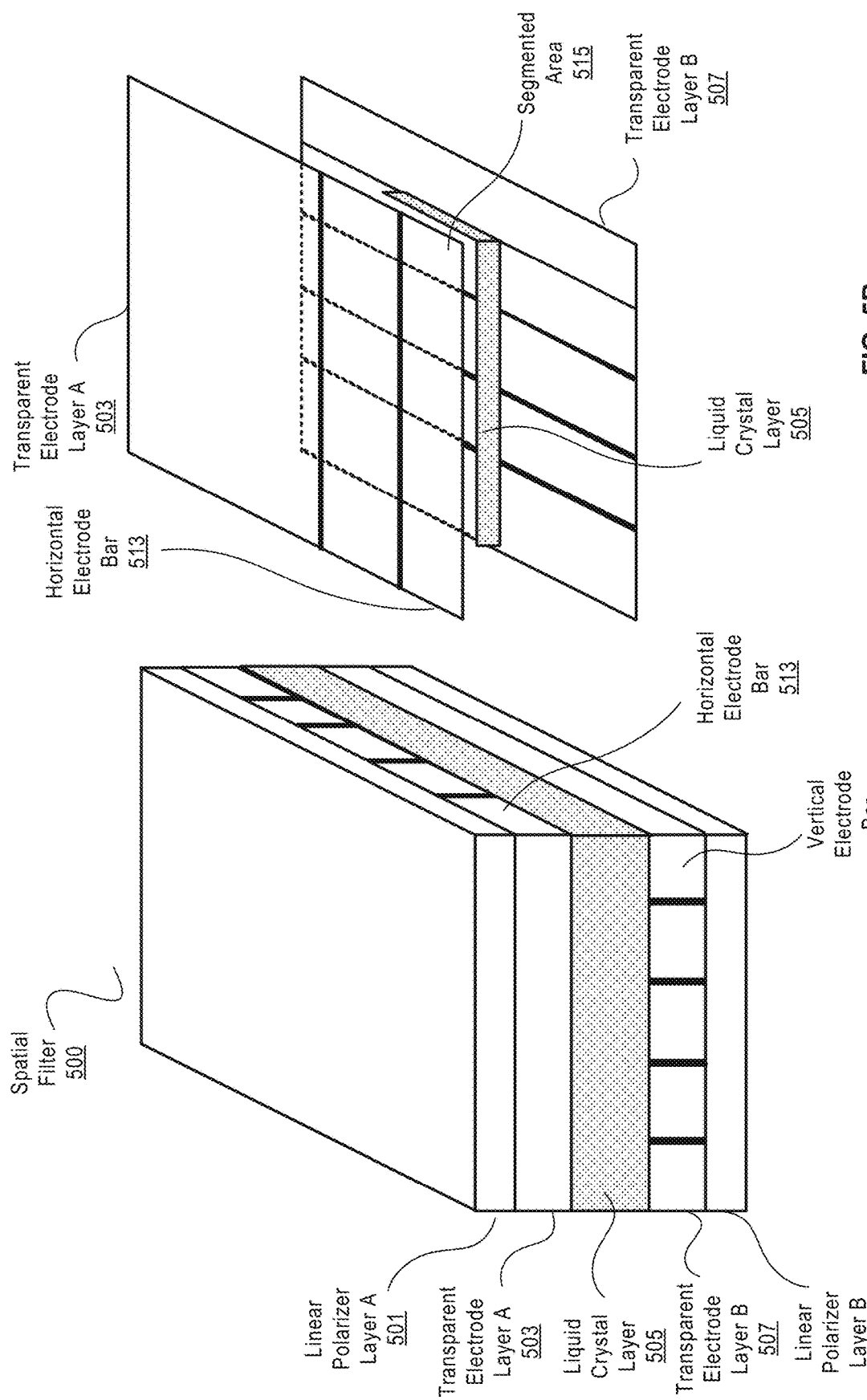
FIGS. 5A-5B illustrate another example implementation of a spatial filter in accordance with an embodiment.

FIGS. 5A-5B illustrate an example implementation of a spatial filter in accordance with an embodiment. The spatial filter implemented here can be the spatial filter illustrated in FIG. 2, FIGS. 3A and 3B, and FIG. 4.

Referring to FIG. 5A, a LCD-based spatial filter 500 includes an aperture layer between two transparent electrode layers 503 and 507. The aperture layer can be a liquid crystal layer 505. A first linear polarizer layer 501 and a second linear polarizer layer 509 are respectively placed on the top of the first transparent electrode layer 503 and below the second transparent electrode layer 507. In one embodiment, ferroelectric liquid crystal can be used for the liquid crystal layer 505 due to the fast switching nature of ferroelectric liquid crystal and its natural binary state. In another embodiment, a different type of liquid crystal can be used. Unlike ferroelectric liquid crystals, other types of liquid crystals change the polarization of incoming beams of laser pulses to a degree that is largely proportional to a voltage applied.

The first transparent electrode layer 503 can be created by attaching multiple transparent horizontal electrode bars to a common physical structure. These horizontal electrode bars can be positioned parallel to each other. In one embodiment, the electrode bars can be parallel to the surface of an integrated circuit on which the laser pulse receiving unit 109 is implemented. The layer of transparent electrode bars 503 can face the imaging lens 202 as shown in FIG. 2, FIG. 3A, FIG. 3B and FIG. 4. Horizontal electrode bar 513 is an example of the multiple transparent electrode bars.

The second transparent electrode layer 507 can be created by attaching to the common physical structure multiple transparent electrode bars that are vertical to the electrode bars in the first transparent electrode layer 503. Vertical electrode bar 511 is an example of the transparent electrode bars in the second transparent electrode layer 507. Each of the vertical electrode bars and the horizontal electrode bars can be made of Indium tin oxide (ITO) or titanium dioxide (TiO2).

Each vertical electrode bar at the layer 507 can cross each horizontal electrode bar at the layer 503. A section where a vertical electrode bar and a horizontal electrode bar cross each other corresponds to a pixel area on the liquid crystal layer 505. The pixel area on the liquid crystal layer 505 is the segmented area on the spatial filter 500 that can be dynamically turned on and turned off.

FIG. 5B shows such a segmented area 515, an area on the liquid crystal layer 505 that corresponds to the area where the horizontal electrode bar 513 and the vertical electrode bar 511 cross each other.

In one embodiment, to turn on the segmented area 515, the controlling unit 107 as shown in FIG. 2 can apply a first voltage (e.g., 10 V) to the horizontal electrode bar 513, and apply a second voltage (e.g., −10 V) to the vertical electrode bar 511. The difference between the two voltages would transform the liquid crystal at the segmented area 515 into a capacitor. Due to the temporary presence of the capacitor, the polarization of laser pulses that pass through the segmented area 515 can remain unchanged. As a result, the liquid crystal at the segmented area 515 can function as a high optical transmission area (i.e., an aperture) on the spatial filter 500. When the first voltage is applied to the horizontal electrode bar 513 and the second voltage is applied to each vertical electrode bar in the layer 507, a whole row of segmented areas can be turned on to function as an aperture corresponding to a vertical steering angle.

To turn off the segmented area 515 that has been turned on in the manner described above, the voltages applied to the horizontal electrode bar 513 and the vertical electrode bar in the layer 511 can be stopped. Without a voltage applied to the horizontal electrode bar 513, the polarization of an incoming beam of laser pulses can be configured to be rotated by 90 degrees by the liquid crystal in the segmented area 513 after passing the first polarizer layer 501. The beam of laser pulses whose polarization has been rotated by 90 degrees would be blocked by the second polarizer layer 509.

Similarly, a whole row of segmented areas can be turned off by stopping applying voltages to the electrode bars used to form the row of segmented areas. It would be appreciated by those skilled in the art that a segmented area would be in an off-state in the first place if no voltage is applied to a vertical electrode bar and to a horizontal electrode bar that forms the segmented area.

Chip-Scale LiDAR Device

Figure 6:
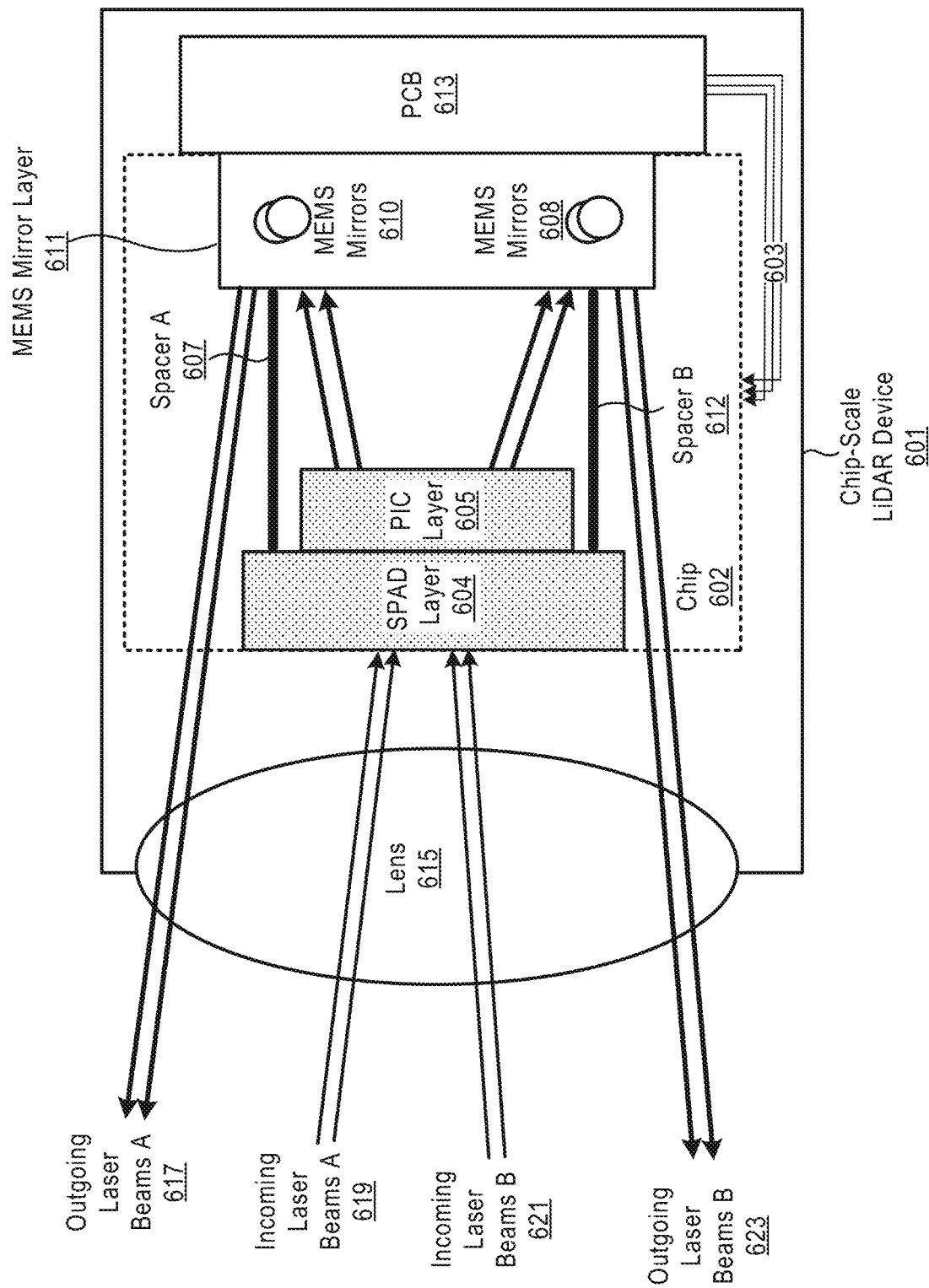
FIG. 6 is a block diagram illustrative of a side view of an example chip-scale LiDAR device in accordance with one embodiment.

FIG. 6 is a block diagram illustrative of a side view of an example chip-scale LiDAR device in accordance with one embodiment.

As shown in FIG. 6, a chip-scale LiDAR device 601 includes a chip 602 with a MEMS mirror layer 611, a photonic integrated circuit (PIC) layer 605 and a SPAD layer 604. The PIC layer 605 can include a laser source, a beam splitter, and a number of waveguides. Laser beams emitted by the laser source can be directed to a number of MEMS mirrors 608 and 610 in the MEMS mirror layer 611. The MEMS mirrors 608 and 610 can steer the laser beams 617 and 623 to a target object. A proportion of each laser beam is reflected from the target object as incoming laser beams 619 and 621 into the SPAD layer, which turns the reflected laser beams into electric signals.

The chip-scale LiDAR device 601 further includes a printed circuit board (PCB) 613 that supplies power through a number of wires 603 to the chip 602; and controls the motion of the MEMS mirrors 608 and 610 using field programmable gate arrays (FPGA).

As further shown, a number of spacers 607 and 612 can be provided between the MEMS mirror layer 611 and the SPAD layer 604 to create spacing between the MEMS mirror layer 611 and the SPAD layer 604. Since the PIC 605 and the SPAD layer 604 are attached to each other via wafer bonding, the spacers 607 and 612 also create spacing between the PIC layer 605 and the MEMS mirror layer 611, enabling laser beams from the laser source on the PIC layer 605 to be directed to a corresponding MEMS mirror on the MEMS mirror layer 611. For example, there can be a spacing of 0.5-1 mm between the PIC layer 604 and the MEMS mirror layer 611.

In one embodiment, the SPAD layer 604 can have larger dimensions than the PIC layer 605. The size of the dimensions determines the field of view of the chip-scale LiDAR device 601, while the dimensions of the PIC layer 605 are related to the cost. Typically, the larger the PIC layer 605, the more expensive to make the PIC layer. Therefore, to ensure a large field of view and a lower cost, the dimensions of the SPAD layer 604 are larger than the dimensions of the PIC layer 605.

Since the SPAD layer 604 faces towards a lens 615, after the SPAD layer 604 is bonded back to back to the PIC layer 605, there can be spaces on the back of the SPAD layer 604 that are not covered by the PIC layer 605. The uncovered area can be used to support spacers. In one implementation, there can be three or more spacers between the SPAD layer 604 and the MEMS mirror layer 611.

Figure 7:
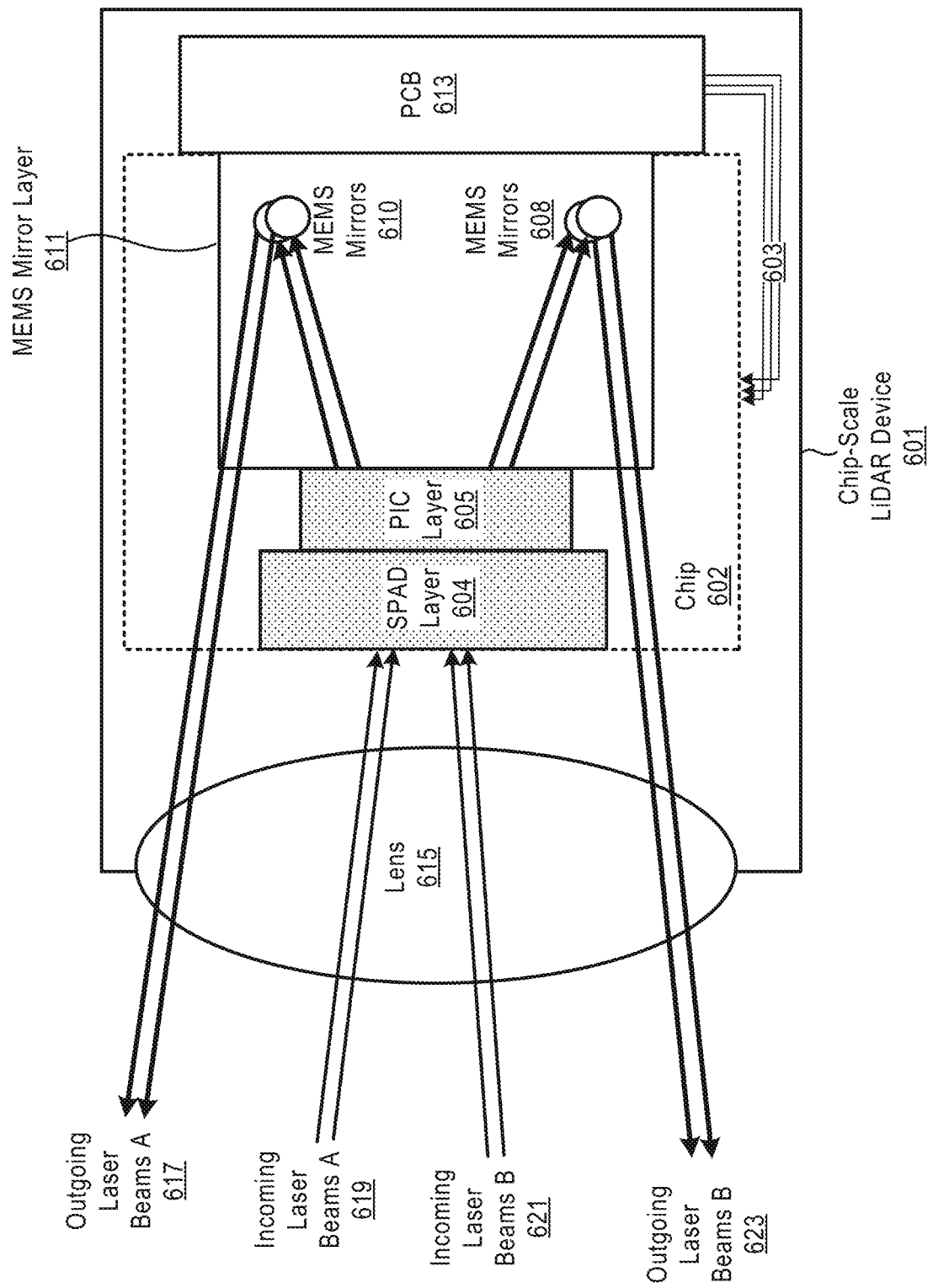
FIG. 7 is a block diagram illustrative of a side view of another example chip-scale LiDAR device in accordance with one embodiment FIG. 8 further illustrates the example chip-scale LiDAR device in accordance with one embodiment.

FIG. 7 is a block diagram illustrative a side view of another example chip-scale LiDAR device in accordance with one embodiment. In FIG. 7, instead of using spacing created by spacers for directing laser beams to their respective MEMS mirrors, the MEMS mirror layer 611 can have a thickness that is approximately equal to the spacing created by the spacers between the PIC layer 605 and the MEMS mirror layer 611. Since the MEMS mirror layer 611 is a glass or another transparent material, the thickness of the MEMS mirror layer 611 would enable laser beams from the laser source on the PIC layer 605 to be directed to a corresponding MEMS mirror on the MEMS mirror layer 611.

Figure 8:
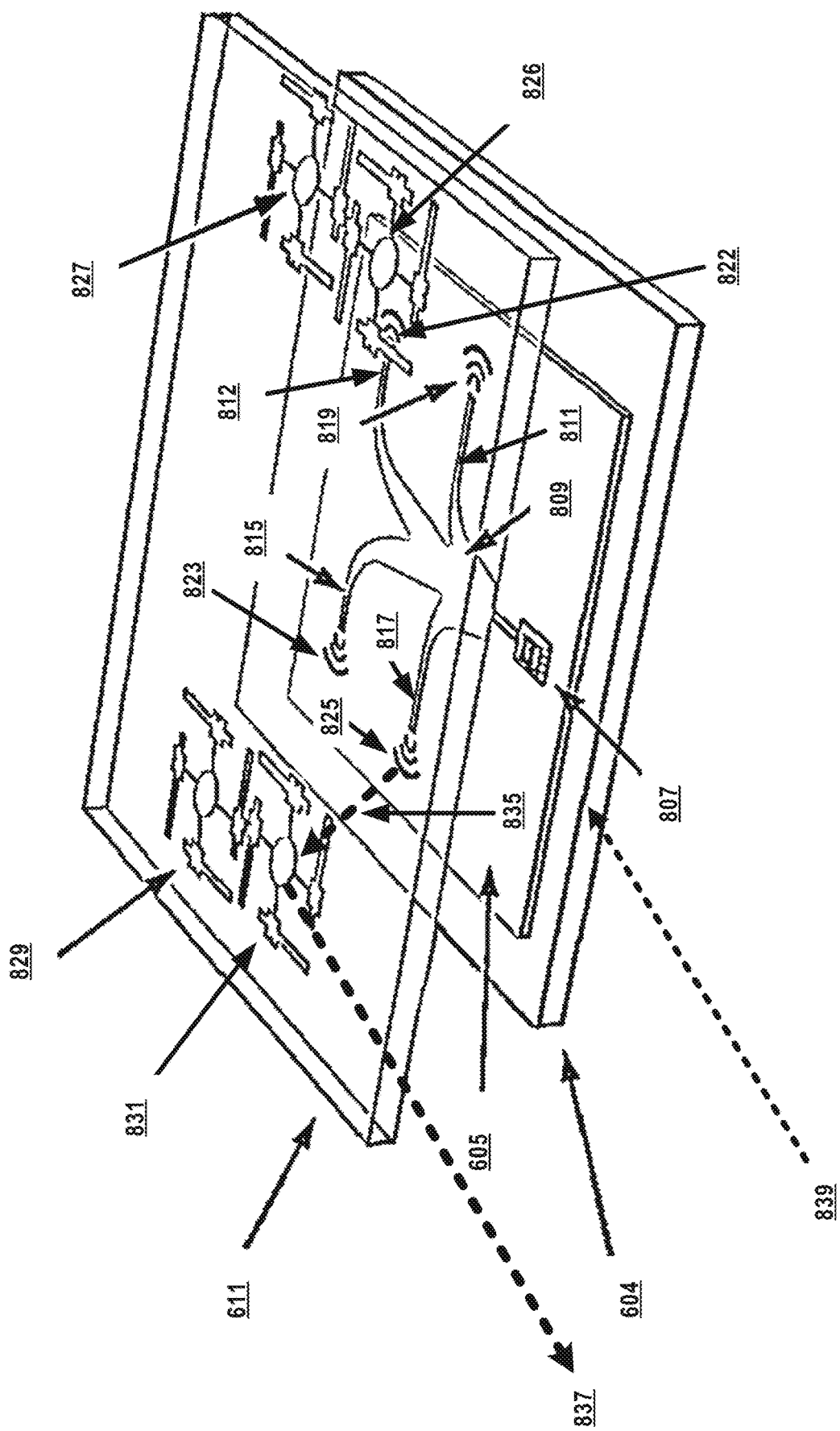

FIG. 8 further illustrates the example chip-scale LiDAR device in accordance with one embodiment. The SPAD layer 604 can be a silicon die fabricated with a plurality of photodetector circuitries. In one embodiment, the SPAD layer 604 can include a number of SPAD arrays, such as the SAPD array 213 as described in FIG. 2.

The PIC layer 605 can also be a silicon die that includes a laser source 807, a beam splitter 809, and a number of waveguides 811, 812, 815, and 817. Each waveguide can be a physical structure that guides laser beams with minimal loss of energy by restricting expansion of the laser beams to one dimension or two.

In one embodiment, the laser source is a laser diode that may operate in the pulsed mode with a pulse repeating every few micro-seconds. The characteristics of laser and laser drive circuits used in the example chip-scale LiDAR device may be chosen according to the desired performance parameters of LiDAR device, for example, the required maximum range of scanned space and resolution.

In the embodiment, each waveguide is connected to the beam splitter 809 on one end and connected to one of multiple beam deflectors 819, 822, 823, and 825 on the other end. The beam splitter 809 is an optical device that splits each of the laser beams directly from the laser source 807 into multiple laser beams. Each of the split laser beams may have less optical power than the original laser beams directly from the laser source 807.

Each beam deflector can deflect the laser beams from the corresponding waveguide out-of-plane of the PIC layer 605 at a predetermined fixed angle towards a corresponding MEMS mirror on the MEMS mirror layer 611. Each beam deflector can be a grating, a mirror, a prism, or any combination thereof. In one embodiment, the PIC layer 605 can include two or more laser sources, with each laser source coupled to a different deflector.

The MEMs mirror layer 611, which is transparent, can be made of glass or any other transparent materials, and can include a number of MEMS mirrors 826, 827, 829, and 831, and 833. Each MEMS mirror can be coupled with one or more two-dimensional actuators that are controlled by a Field Programmable Gate Array (FPGA) subsystem. An example of such a FPGA subsystem can be 12-bit. A different pair of channels of the FPGA system can be used to control X and Y axis of each MEMS mirror. The FPGA subsystem can provide rotations up to a predetermined degree (e.g., up to ±20°) about each axis, and can steer each MEMS mirror in a zigzag or spiral pattern. With the FPGA operating as such, a pair of deflector and a corresponding MEMS mirror can cover azimuthal (i.e., horizontal) and altitudinal (i.e., vertical) optical angles of a variety of sizes. The angles of the MEMS mirror and timing of the corresponding beams of laser pulses can be used by the FPGA subsystem to track azimuthal and altitudinal angles of outgoing beams of laser pulses.

In one embodiment, the deflector 819 and the MEMS mirror 826 can form a pair, the deflector 822 and the MEMS mirror 827 can form a pair, the deflector 823 and the MEMS mirror 829 can form a pair, and the deflector 825 and the MEMS mirror 831 can form a pair. Each pair of deflector and MEMS mirror cover up to a specific range of angles, e.g., up to 32° of azimuthal and altitudinal optical angles. All the pairs of deflector and MEMS mirror in combination can cover a desirable range of angles.

FIG. 8 uses the deflector 825 and the MEMS mirror 831 to illustrate a typical path of a laser beam. As shown in the figure, a laser beam emitted by the laser source 807 is split into multiple laser beams, with one of the split laser beams guided by the waveguide 817 to the deflector 825, which directs the laser beam to the MEMS mirror 831. The MEMS mirror 831 is controlled by one or more actuators to steer the outgoing laser beam 837 at a desired angle. After the outgoing laser beam hits a target object, a proportion of the laser beam 839 is reflected and received by the SPAD array on the side of the SPAD layer 604 that is opposite to the side of the PIC layer 605.

Figure 9:
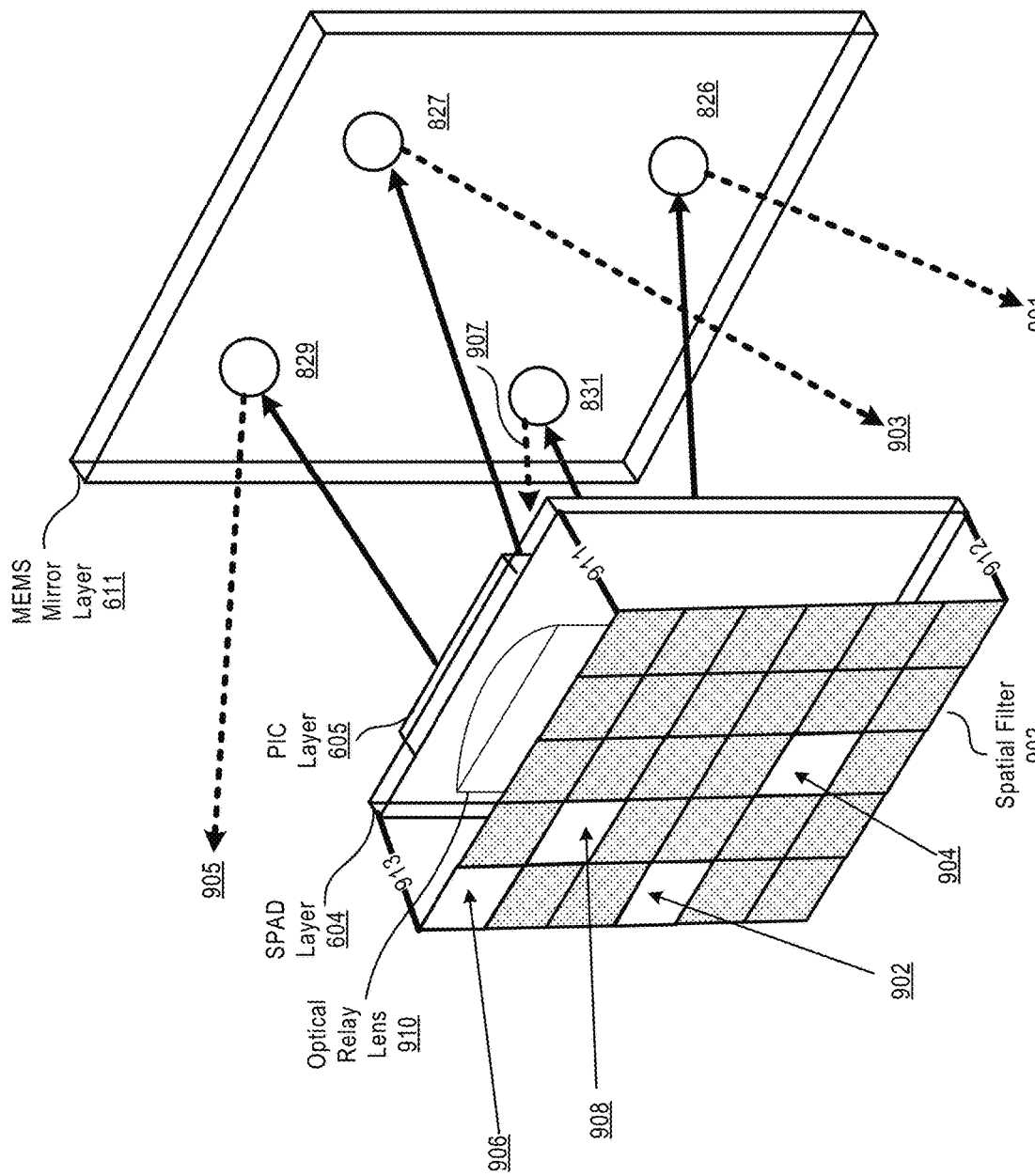
FIG. 9 further illustrates another example chip-scale LiDAR device in accordance with an embodiment.

FIG. 9 further illustrates another example chip-scale LiDAR device in accordance with an embodiment. As shown, the SPAD layer 604 includes a spatial filter 902 and an optical relay lens 910 as described in FIG. 2, FIGS. 3A-3B and FIG. 4.

As the MEMS mirrors 826, 827, 829 and 831 direct laser beams 901, 903, 905 and 907 to one or more target objects, reflected laser beams may pass through dynamically created apertures on the spatial filter 902 to be incident on SPAD arrays on the SPAD layer 604.

As further shown, a number of spacers (e.g., spacers 911, 912, and 913) can be used to create spacing between the SPAD layer 604 and the spatial filter 902, such that the optical relay lens 910 can project the reflected laser beams 902, 904, 906, and 908 that have passed through the spatial filter 902 onto different columns of the SPADs on the SPAD layer 604.

FIGS. 10A-10E illustrate a process of making a chip-scale LiDAR device in accordance with an embodiment.

In FIG. 10A, a silicon wafer 1001 can be fabricated with a number of dies (e.g., die 1037) thereon, each die representing the SPAD layer described above. Although the wafer 1001 shows only 9 dies, the number of dies on the silicon wafer 1001 can be up to tens of thousands. As further shown, a silicon wafer 1005 with a number of PIC dies (e.g., die 1006) can be also be fabricated, with the number of dies thereon being equal to the number of dies on the silicon wafer 1001. FIG. 10A also shows a silicon wafer 1003 with a number of dies, each with an MEMS mirror (e.g., MEMS mirror 1004) fabricated thereon.

In FIG. 10B, the silicon wafer 1001 can be flipped and aligned with the silicon wafer 1005, such that the silicon wafer 1001 and the silicon wafer 1005 can be attached to each other back to back using wafer bonding techniques in low temperatures. In one embodiment, bonding bumps in the corresponding bonding pads on the back of the wafer 1001 (e.g., bonding pad 1007) and on the back of the wafer 1005 can be melted to bond the two wafers together.

In FIG. 10C, the two wafers 1001 and 1005, which have been integrated at the wafer level, can be cut into a number of 3D integrated dies 1015-1031, with each 3D integrated die including a PIC die and a SPAD die.

In FIG. 10D, the silicon wafer 1003 can be cut into a number of dies, with each die including a MEMS mirror. The number of MEMS mirrors on the wafer 1003 vary with the size of the silicon wafer 1003. In one embodiment, a set of MEMS mirrors can be glued to a glass panel 1041 using polymer-based adhesives. The number of MEMS mirrors in the set of MEMS mirrors is equal to the number of waveguides in the PIC die.

In FIG. 10E, markings can be made on both the silicon glass panel 1041 with the MEMS mirrors glued thereon, and on the back of the SPAD die of the 3D integrated die 1025. The glass panel 1041 and the 3D integrated die 1025 can be attached to each other using solder bonding, with a number of spacers at the markings to separate the glass panel 1041 and the integrated die 1025.

In one embodiment, if the glass panel 1041 is sufficiently thick, no spacers are needed between the glass panel 1041 and the SPAD die; the glass panel 1041 can be attached directly to the PIC die using solder bonding.

Figure 11:
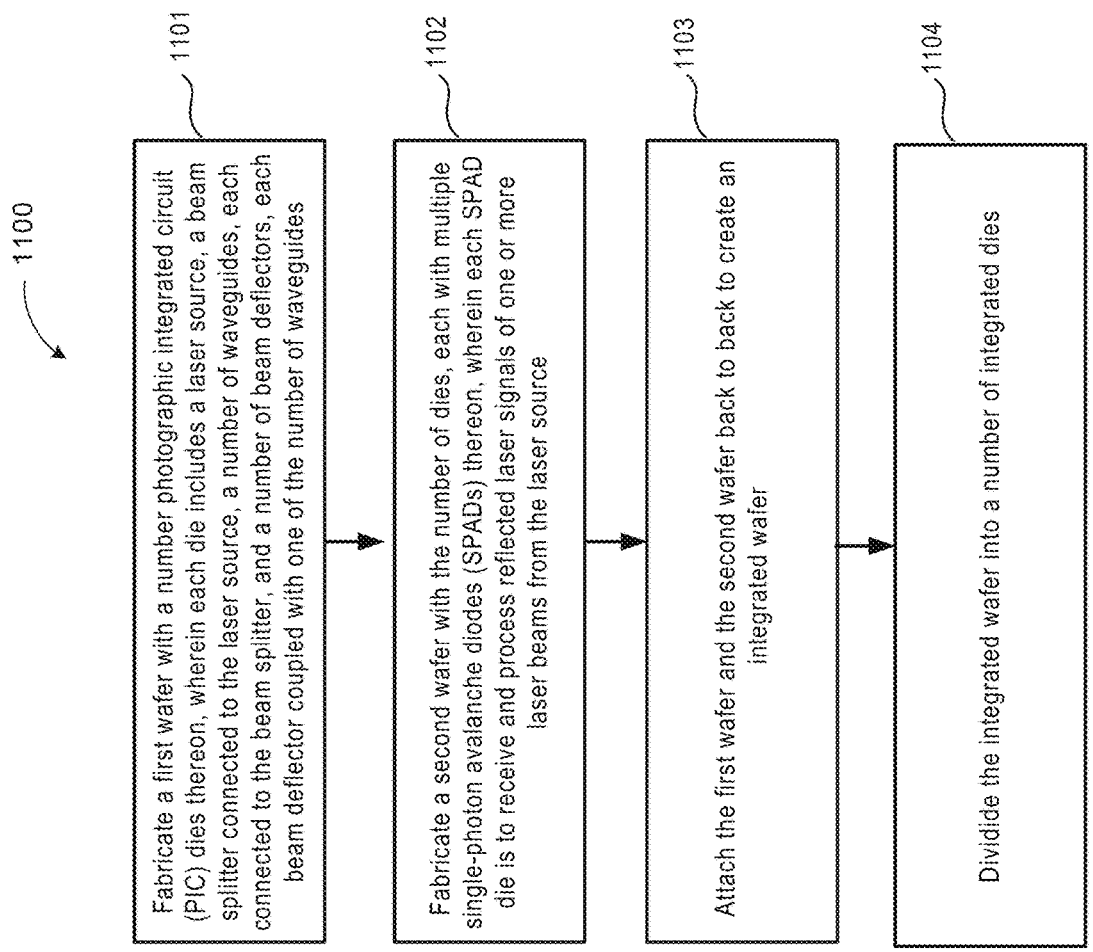
FIG. 11 illustrates an example process 1100 of making a chip-scale LiDAR device in accordance with an embodiment.

FIG. 11 illustrates an example process 1100 of making a chip-scale LiDAR device in accordance with an embodiment.

In block 1101, a first wafer with a number of photonic integrated circuit (PIC) dies thereon, wherein each die includes a laser source; a beam splitter connected to the laser source; a number of waveguides, each waveguide connected to the beam splitter; and a number of beam deflectors, each beam deflector coupled with one of the number of waveguides. In block 1102, a second wafer with a number of dies is fabricated, where each die has multiple single-photon avalanche diodes (SPADs) thereon for receiving and processing reflected laser signals of one or more laser beams from the laser source. In block 1103, the first wafer and the second wafer are attached back to back to create an integrated wafer. In block 1104, the integrated wafer is divided into a number of integrated dies.

Some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A chip-scale light detection and ranging (LiDAR) device, comprising:
   a first layer with a number of micromechanical (MEMS) mirrors fabricated thereon;
   a second layer, which includes
      a laser source,
      a beam splitter connected to the laser source,
      a number of waveguides, each connected to the beam splitter, and
      a number of beam deflectors, each beam deflector coupled with one of the number of waveguides; and
   a third layer, which includes a receiving unit for receiving and processing reflected laser signals of one or more laser beams from the laser source;
   wherein the first layer, the second layer, and the third layer are vertically attached to each other.

2. The LiDAR device of claim 1, wherein the second layer and the third layer are attached to each other using wafer bonding, and wherein the first layer and the third layer are attached to each other using solder bonding.

3. The LiDAR device of claim 2, wherein one or more spacers are used to create spacing between the first layer and the third layer such that the one or more laser beams from the laser source in the second layer can be directed to their respective MEMS mirrors on the first layer.

4. The LiDAR device of claim 3, wherein the second layer and the third layer are attached to each other using wafer bonding, and wherein the first layer and the second layer are directly attached to each other using solder bonding.

5. The LiDAR device of claim 4, wherein the first layer is a glass panel with a predetermined thickness, which enables the one or more laser beams from the laser source in the second layer to be directed to their respective MEMS mirrors on the first layer.

6. The LiDAR device of claim 1, wherein the number of MEMS mirrors, the number of waveguides, and the number of beam deflectors are the same and have a one-to-one relationship.

7. The LiDAR device of claim 1, wherein the beam deflector is to deflect one or more laser beams from the laser source out of plane from the second layer to a corresponding MEMS mirror on the first layer.

8. The LiDAR device of claim 7, wherein the one or more laser beams are guided from the laser source in the second layer to the beam deflector through a corresponding waveguide.

9. The LiDAR device of claim 1, wherein each of the number of MEMS mirrors on the first layer is coupled to one or more actuators, which are configured to scan the MEMS mirror in a zigzag or spiral pattern to steer laser beams from the laser source to one or more different directions.

10. The LiDAR device of claim 9, wherein the receiving unit in the third layer includes
    a spatial filter, wherein an aperture on the spatial filter is dynamically created based on one or more directions that each of the number of MEMS mirrors on the first layer is scanning, the aperture enabling photons reflected from the one or more directions to pass through the spatial filter.

11. A method of making a chip-scale light detection and ranging (LiDAR) device, comprising:

fabricating a first wafer with a number of photonic integrated circuit (PIC) dies, each PIC die with a PIC formed thereon, wherein the PIC includes a laser source, a beam splitter connected to the laser source, a number of waveguides, each connected to the beam splitter, and a number of beam deflectors, each beam deflector coupled with one of the number of waveguides;

fabricating a second wafer with the number of single-photon avalanche diodes (SPADs) dies, each SPAD die with multiple SPADs formed thereon, wherein each SPAD die is to receive and process reflected laser signals of one or more laser beams from the laser source;

attaching the first wafer and the second wafer back to back to create an integrated wafer; and dividing the integrated wafer into a number of integrated dies.

12. The method of claim 11, further comprising:

fabricating a third wafer with multiple micromechanical system (MEMS) mirror dies, each MEMS mirror die with a MEMS mirror formed thereon; and dividing the third wafer into different MEMS mirror dies.

13. The method of claim 12, further comprising:

attaching one or more of the multiple MEMS mirror dies to a glass panel; and attaching the glass panel to an integrated die of the number of integrated dies.

14. The method of claim 13, wherein the glass panel and the integrated die are attached to each other using solder bonding.

15. The method of claim 13, wherein one or more spacers are used to create spacing between the glass panel and the PIC die of the integrated die for the one or more laser beams to be directed to their respective MEMS mirror attached to the glass panel.

16. The method of claim 13, wherein the glass panel and the PIC die of the integrated die are directly attached to each other using solder bonding.

17. The method of claim 13, wherein the number of the one or more MEMS dies attached to the glass panel is equal to the number of waveguides in the PIC die.

18. The method of claim 16, wherein the glass panel has a predetermined thickness, which enables the one or more laser beams from the laser source in the PIC die to be directed to an MEMS mirror attached to the glass panel.

19. The method of claim 12, wherein the number of MEMS mirrors, the number of waveguides, and the number of beam deflectors are the same and have a one-to-one relationship.

20. The method of claim 11, wherein the SPAD die includes a plurality of photodetectors arranged into a two-dimension array, each photodetector being a SPAD, and wherein the SPAD die has larger dimensions than the PIC chip.

* * * * *